United States Patent [19]
Krause

[11] Patent Number: 5,974,303
[45] Date of Patent: Oct. 26, 1999

[54] LOCKING MECHANISM FOR BATTERY HOUSINGS

[75] Inventor: Manfred Krause, Breckerfeld, Germany

[73] Assignee: Varta Batterie Aktiengesellschaft, Hannover, Germany

[21] Appl. No.: 08/844,216

[22] Filed: Apr. 18, 1997

[30] Foreign Application Priority Data

Apr. 18, 1996 [DE] Germany ............... 296 07 055 U

[51] Int. Cl.⁶ ................................................ H04B 1/38
[52] U.S. Cl. ............................................. 455/90; 292/80
[58] Field of Search .............................. 379/433, 428; 320/112, 114; 429/96, 100, 97, 98; D13/103, 107; 455/90, 575, 572, 348, 349; 24/615, 616; 292/80, 81, 87, 89; D14/240

[56] References Cited

U.S. PATENT DOCUMENTS

| 4,850,735 | 7/1989 | Hansen et al. ............... 24/615 |
| 4,904,549 | 2/1990 | Goodwin et al. ............. 429/97 |
| 5,642,404 | 6/1997 | Hsu ............................... 455/90 |

FOREIGN PATENT DOCUMENTS 0 367 608  2/1996  European Pat. Off. ........ 455/90

*Primary Examiner*—Reinhard J. Eisenzopf
*Assistant Examiner*—Greta Fuller
*Attorney, Agent, or Firm*—Weiser and Associates, P.C.

[57] ABSTRACT

A battery housing for an electrical device, such as a portable telephone, has a locking mechanism that locks the battery housing in place onto the housing of the portable device. The locking mechanism has a locking finger that is inserted into an opening in the device housing. The locking finger is spring mounted on the housing bottom of the battery housing and collaborates with at least one sliding surface which preferably has the shape of an inclined plane over which the locking finger can be forced out of the locked position by means of a movable key.

16 Claims, 1 Drawing Sheet

LOCKING MECHANISM FOR BATTERY HOUSINGS

BACKGROUND OF THE INVENTION

1. Field of the Invention

The present invention relates to battery housings, and, in particular, to battery housings for electrical devices, such as portable telephones.

2. Description of the Related Art

Electrical devices, such as portable telephones, may be powered by one or more batteries. In some devices, the batteries are held in battery housings that can be separated from the device for charging. Such battery packs may be inserted into the back of the device along guide rails, at which time the electrical contact is also provided. The battery housings are locked into place to avoid the unintended detachment of the battery pack from the device.

One variant of such a battery pack for a portable telephone is disclosed in European Patent 367 608. In this case, the battery housing is provided with guide rails, which are inserted into corresponding guides on the telephone so that the battery housing can be slid onto the telephone housing. A snap-lock mechanism is provided on the battery housing to lock the battery pack into place. The snap-lock mechanism contains a locking pawl attached to a torsion rod which projects into an opening on the telephone housing.

One purpose of the present invention is to devise a locking mechanism of relatively simpler design that is easily produced and assures reliable locking and unlocking of the battery housing onto an electrical device, such as a portable telephone.

Further aspects and advantages of this invention will become apparent from the detailed description which follows.

SUMMARY OF THE INVENTION

Embodiments of the present invention are directed to a battery housing for mounting onto housing of an electrical device. The battery housing comprises a locking mechanism having a locking finger adapted to be inserted in a locked position into an opening on the device housing. The locking finger is spring loaded and has at least one sliding surface on which the locking finger can be forced out of the locked position by a movable key of the locking mechanism.

Alternative embodiments of the present invention are directed to a battery housing for an electrical device. The battery housing has a locking mechanism for locking the battery housing onto housing of the device. The locking mechanism has a spring-loaded locking finger having one or more sliding surfaces and adapted to be inserted into an opening on the device housing to place the battery housing in a locked position onto the device housing. The locking mechanism also has a movable key adapted to collaborate with the sliding surfaces to force the locking finger out of the locked position to permit removal of the battery housing from the device housing.

Further alternative embodiments of the present invention are directed to an electrical device having a removable battery housing. The battery housing has a locking mechanism for locking the battery housing onto housing of the device. The locking mechanism has a spring-loaded locking finger having one or more sliding surfaces and adapted to be inserted into an opening on the device housing to place the battery housing in a locked position onto the device housing. The locking mechanism also has a movable key adapted to collaborate with the sliding surfaces to force the locking finger out of the locked position to permit removal of the battery housing from the device housing.

BRIEF DESCRIPTION OF THE DRAWINGS

Other aspects, features, and advantages of the present invention will become more fully apparent from the following detailed description, the appended claims, and the accompanying drawing in which:

DETAILED DESCRIPTION

The present invention is directed to a battery housing that can be mounted onto an electrical device, such as a portable telephone. According to embodiments of the present invention, a locking mechanism of the battery housing has a locking finger that is spring mounted in the battery housing and collaborates with at least one sliding surface over which the locking finger can be forced out of the locked position by a movable key. Each sliding surface is preferably designed as an inclined plane. It is advantageous to arrange the locking finger near the center of a spring-loaded supporting beam and to arrange, on both sides of the locking finger, sliding surfaces in the form of inclined planes, each of which collaborates with a tongue arranged on the movable key.

Figure 1:
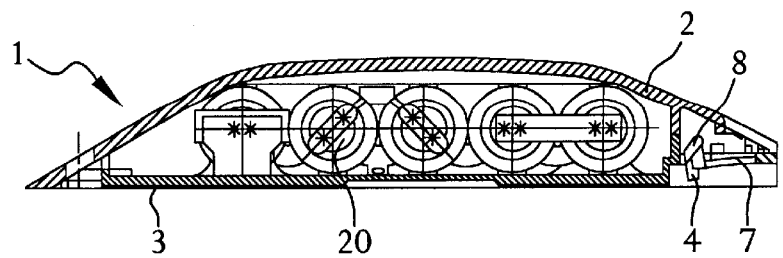
FIG. 1 shows a cross-sectional view of a battery housing, according to one embodiment of the present invention.

FIG. 1 shows a cross-sectional view of a battery housing 1, according to one embodiment of the present invention. Battery housing 1 may be used to hold batteries for powering an electrical device, such as a portable telephone. Battery housing 1 comprises a housing top 2 and a housing bottom 3. In one implementation, after batteries 20 are inserted into battery housing 1, the locking mechanism is assembled by cementing or welding the locking-mechanism components together. The electrical connections of battery housing 1 are not shown in FIG. 1. In alternative embodiments, flat or prismatic batteries may be used instead of cylindrical batteries, resulting in an overall flatter design of the battery housing.

Figure 2:
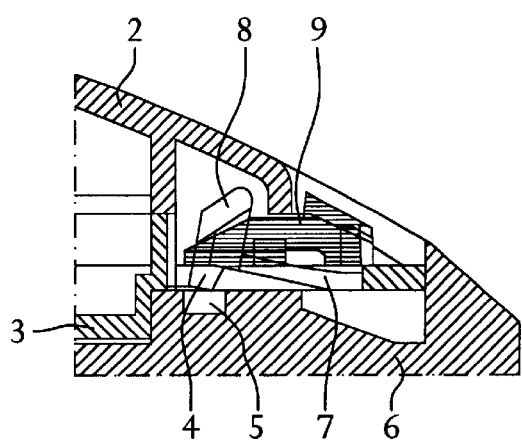
FIG. 2 shows an enlarged schematic view of part of the battery housing of FIG. 1, in which the locking mechanism is in the unlocked state.
Figure 4:
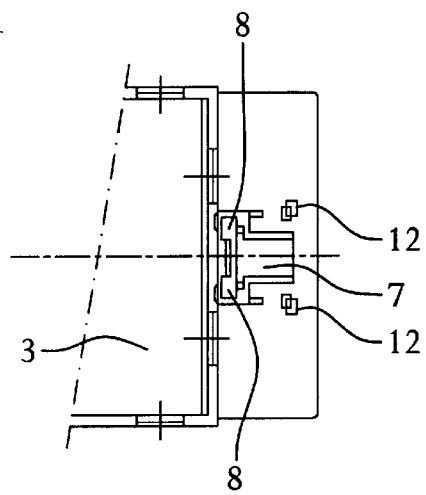
FIG. 4 shows a top view of the part of the battery housing shown in FIGS. 2–3.
Figure 3:
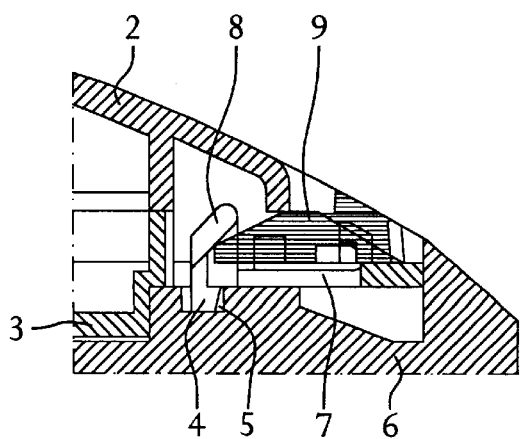
FIG. 3 shows an enlarged schematic view of the part of the battery housing of FIG. 2, in which the locking mechanism is in the locked state.

FIGS. 2 and 3 show enlarged schematic views of part of battery housing 1 of FIG. 1, with battery housing 1 inserted into housing 6 of a portable telephone. In FIG. 2, the locking mechanism of battery housing 1 is in the unlocked state, while, in FIG. 3, the locking mechanism is in the locked state. FIG. 4 shows a top view of the part of battery housing 1 of FIG. 1 that is shown in FIGS. 2–3.

According to the embodiment of FIGS. 1–4, the locking mechanism of battery housing 1 has locking finger 4, which is spring mounted in housing bottom 3 of battery housing 1. In the locked state, locking finger 4 is inserted into opening 5 in housing 6 of the portable telephone. Locking finger 4 is arranged on supporting beam 7, which is spring mounted under tension.

Figure 5:
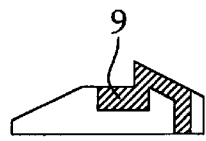
FIG. 5 shows a cross section view of a movable key of the locking mechanism of FIGS. 1–4, according to one embodiment of the present invention.
Figure 6:
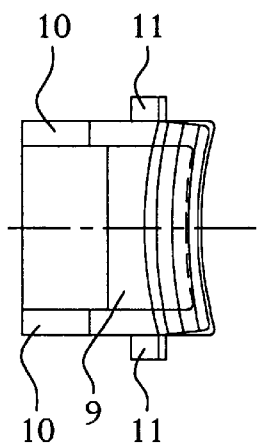
FIG. 6 shows a top view of the movable key of FIG. 5.

FIG. 5 shows a cross section view of movable key 9 of FIGS. 2 and 3. FIG. 6 shows a top view of movable key 9 of FIG. 5. Sliding surface 8, which is provided on supporting beam 7, collaborates with movable key 9. Movable key 9 is introduced before housing top 2 and housing bottom 3 are joined together. When the locking mechanism is in the unlocked position, as shown in FIG. 2, battery housing 1 can be removed from telephone housing 6.

By moving movable key 9 along sliding surface 8 on supporting beam 7, locking finger 4 is brought out of its unlocked position and into the locked position shown in FIG. 3, in which battery housing 1 is locked into telephone housing 6. Since supporting beam 7 is inserted into housing bottom 3 under tension, locking finger 4 remains in the locked position. Sliding surface 8, over which movable key 9 is pushed, is preferably designed as an inclined plane.

It is advantageous to place locking finger 4 near the center at the end of spring-mounted supporting beam 7 and to arrange sliding surfaces 8 in the form of inclined planes on both sides above locking finger 4. These sliding surfaces each collaborate with tongues 10, which are arranged on movable key 9. Projections 11 are provided on movable key 9 as holders and end stops for movable key 9. Projections 11 engage corresponding holding notches 12 on housing bottom 3.

The locking mechanism according to the present invention is relatively simple to produce and operates reliably to prevent any unintended removal of the battery housing from an electrical device.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Battery housing for mounting onto housing of an electrical device, the battery housing comprising a locking mechanism having a locking finger adapted to be inserted in a locked position into an opening on the device housing, wherein the locking finger is spring loaded and has at least one sliding surface on which the locking finger can be forced out of the locked position by a movable key of the locking mechanism, the sliding surface in the form of inclined planes extending on both sides of the locking finger, and each sliding surface collaborating with a tongue arranged on the movable key.

2. The battery housing of claim 1, wherein each sliding surface is an inclined plane.

3. The battery housing of claim 1, wherein:
the locking finger is near the center of a spring-loaded supporting beam.

4. The battery housing of claim 1, wherein the electrical device is a portable telephone.

5. A battery housing for an electrical device, the battery housing having a locking mechanism for locking the battery housing onto housing of the device, the locking mechanism comprising:

(a) a spring-loaded locking finger having one or more sliding surfaces and adapted to be inserted into an opening on the device housing to place the battery housing in a locked position onto the device housing the locking finger having an inclined-plane sliding surface on each side of the locking finger, each sliding surface collaborating with a tongue arranged on the movable key; and (b) a movable key adapted to collaborate with the sliding surfaces to force the locking finger out of the locked position to permit removal of the battery housing from the device housing.

6. The battery housing of claim 5, further comprising a housing top permanently mounted to a housing bottom, wherein the movable key is installed in the locking mechanism prior to the permanent mounting of the housing top to the housing bottom.

7. The battery housing of claim 5, wherein each sliding surface is an inclined plane.

8. The battery housing of claim 5, wherein:
the locking finger is near the center of a spring-loaded supporting beam.

9. The battery housing of claim 8, wherein the spring-loaded supporting beam holds the movable key in place to keep the locking finger in the locked position.

10. The battery housing of claim 5, wherein the electrical device is a portable telephone.

11. An electrical device having a removable battery housing, the battery housing having a locking mechanism for locking the battery housing onto housing of the device, the locking mechanism comprising:

(a) a spring-loaded locking finger having one or more sliding surfaces and adapted to be inserted into an opening on the device housing to place the battery housing in a locked position onto the device housing, the locking finger having an inclined-plane sliding surface on each side of the locking finger, each sliding surface collaborating with a tongue arranged on the movable key; and (b) a movable key adapted to collaborate with the sliding surfaces to force the locking finger out of the locked position to permit removal of the battery housing from the device housing.

12. The electrical device of claim 11, wherein the battery housing further comprises a housing top permanently mounted to a housing bottom, wherein the movable key is installed in the locking mechanism prior to the permanent mounting of the housing top to the housing bottom.

13. The electrical device of claim 11, wherein each sliding surface is an inclined plane.

14. The electrical device of claim 11, wherein:
the locking finger is near the center of a spring-loaded supporting beams.

15. The electrical device of claim 14, wherein the spring-loaded supporting beam holds the movable key in place to keep the locking finger in the locked position.

16. The electrical device of claim 11, wherein the electrical device is a portable telephone.

* * * * *